Figure 1:
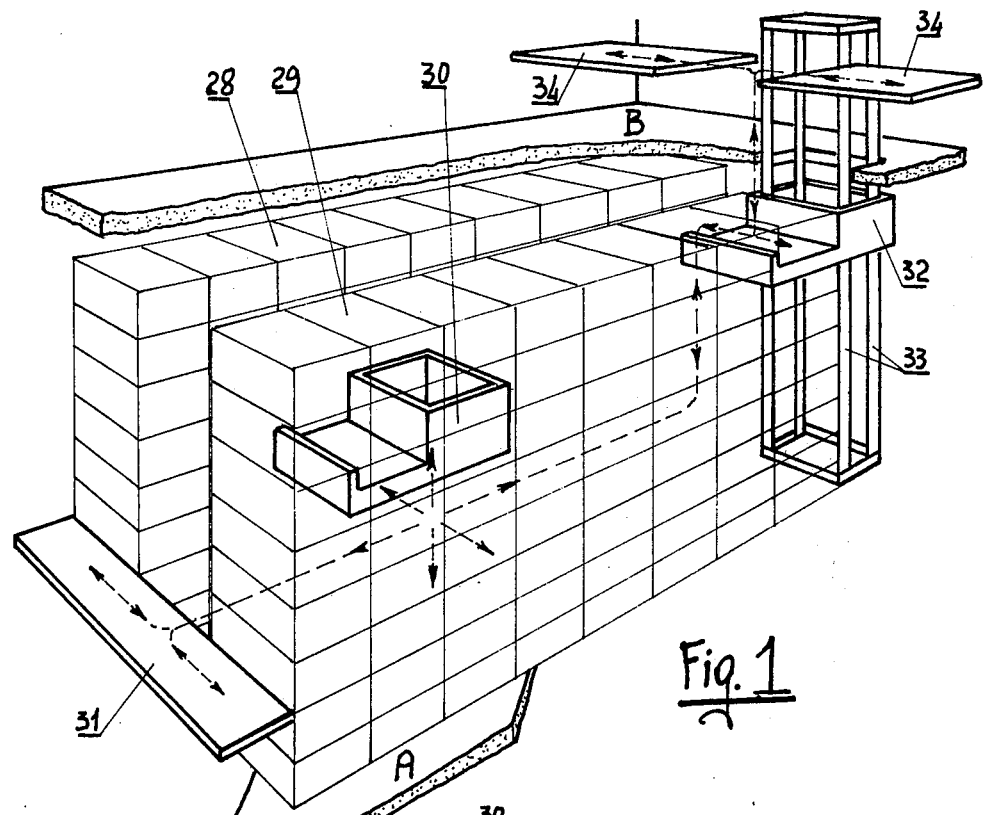

United States Patent [19]

Di Liddo

[11] 4,116,511

[45] * Sep. 26, 1978

[54] AUTOMATIC FILING CABINET RETRIEVAL APPARATUS

[75] Inventor: Natale Di Liddo, Borgo San Dalmazzo (Cuneo), Italy

[73] Assignee: Instituto Grafico Bertello S.p.A., Italy

[*] Notice: The portion of the term of this patent subsequent to Dec. 28, 1993, has been disclaimed.

[21] Appl. No.: 772,870

[22] Filed: Feb. 28, 1977

[30] Foreign Application Priority Data

Mar. 23, 1976 [IT] Italy .................................. 12544 A/76

[51] Int. Cl.² ......................... B65G 17/00; A47B 49/00
[52] U.S. Cl. ..................................... 312/268; 312/298; 214/16.4 A
[58] Field of Search .............. 312/282, 268, 298, 200; 214/730, 16.4 A

[56] References Cited

U.S. PATENT DOCUMENTS

| | | | |
|---|---|---|---|
| 493,542 | 3/1893 | Bessing et al. | 214/16.4 A |
| 3,412,876 | 11/1968 | Calabrese | 214/16.4 A |
| 3,547,282 | 12/1970 | Hartbauer | 214/16.4 A |
| 3,581,915 | 6/1971 | Saul | 214/16.4 A |
| 3,633,769 | 1/1972 | Dubinsky | 214/16.4 A |
| 3,802,580 | 4/1974 | Castaldi | 214/16.4 A |
| 3,933,257 | 1/1976 | Weber | 214/730 |
| 3,999,823 | 12/1976 | Di Liddo | 312/268 |
| 4,016,987 | 4/1977 | Stolzer | 214/16.4 A |

*Primary Examiner*—Mervin Stein
*Assistant Examiner*—Victor N. Sakran
*Attorney, Agent, or Firm*—Jacobs & Jacobs

[57] ABSTRACT

An automatic filing cabinet retrieval apparatus comprises two automatic retrieval saddles, the first saddle being located between two facing banks of filing cabinets containing filing cabinet drawers and being operable to extract a drawer from either bank and deliver it to a consultation location on the same level of the banks or to the second saddle, as well as being operable to return a drawer to its bank from the second saddle or from the consultation location, and the second saddle being operable to receive a drawer from the first saddle, to deliver the drawer to another consultation location above and/or below the level of the banks and to return the drawer from these consultation locations to the first saddle.

6 Claims, 2 Drawing Figures

AUTOMATIC FILING CABINET RETRIEVAL APPARATUS

The present invention relates to automatic filing cabinet systems of the type where an automatic retrieval saddle is used to extract a drawer from a bank of files and to deliver the drawer to a consultation location and return the drawer to its bank from the consultation station.

In my U.S. Pat. No. 3,999,823, issued Dec. 28, 1976, entitled "Improvements Relating to Automatic Retrieval Saddles for Filing Cabinets," which is incorporated herein by reference thereto, there is described an automatic filing cabinet system having two spaced, facing banks of filing cabinets having a plurality of filing cabinet drawers with an automatic retrieval saddle located between the banks that is capable automatically of extracting individual drawers and delivering the drawers to a consultation location at either end of the bank. This automatic retrieval saddle is capable of depositing an extracted drawer either on the right side or the left side of the consultation location. Similarly, this saddle can take a drawer from the right side or the left side of the consultation station and return it to its position in the bank.

While the system in my said patent is a substantial improvement in the art, nevertheless there is still room for improvement. For example, in sophisticated filing cabinet storage systems, the banks of filing cabinets are often stored on more than one floor of a building and the offices of the people who will use the filing cabinets may be on still other floors. There is thus a substantial movement of people between different levels in the building in order that the staff can take files from and return files to the filing banks.

It is an object of the present invention to provide an automatic filing cabinet retrieval apparatus for delivery of filing cabinet drawers to consultation locations above and/or below the banks of files.

This is accomplished by the present invention, which provides an improvement in the filing cabinet system of my said patent by including a second automatic retrieval saddle, constructed and operated in the same way as the saddle described in said patent except that this additional saddle is arranged to move vertically between one or more consultation locations above and/or below the banks.

In particular, the present invention provides an automatic filing cabinet retrieval apparatus for delivery of drawers to a consultation station, comprising two spaced, facing banks of filing cabinets having a plurality of filing cabinet drawers, a vertically extending support frame, a first automatic retrieval saddle means mounted on said support frame for reciprocal vertical movement to and from a consultation station at a different vertical level than said banks, a second automatic retrieval saddle means between said banks for extracting a drawer from either bank and delivering said drawer to said second saddle means and for returning an extracted drawer to its bank, said first and second saddle means being operable to transfer an extracted drawer between them, and said first saddle means being operable to deliver a drawer to said consultation location and to return a said drawer from said consultation location to said second saddle.

Figure 2:
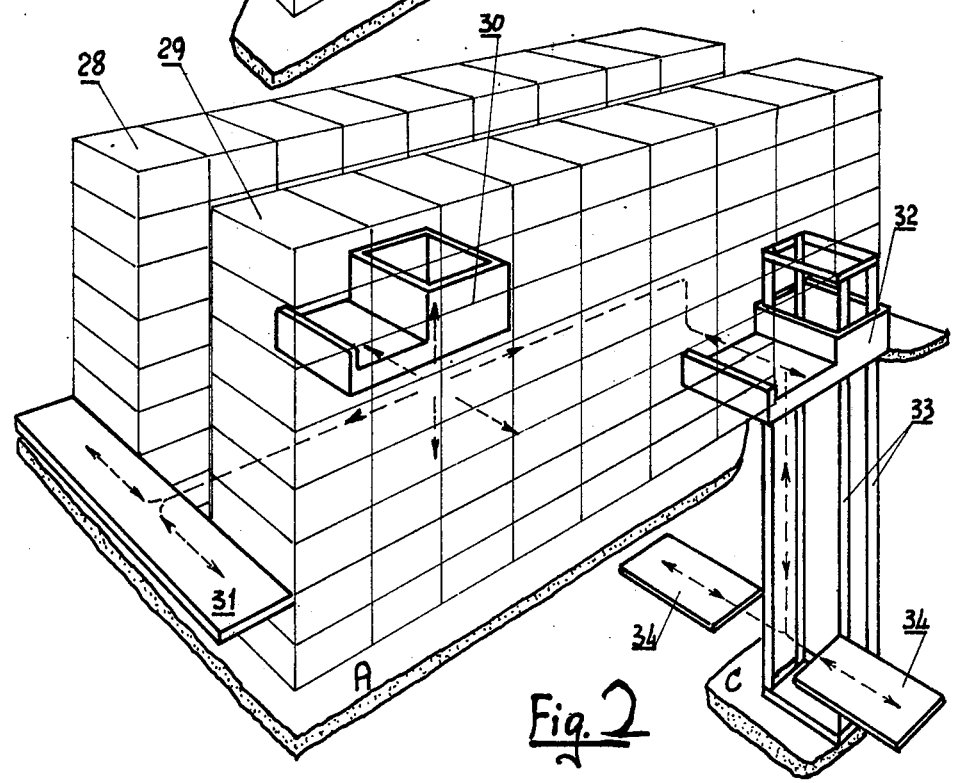

The present invention is illustrated in terms of a preferred embodiment in the accompanying drawing, in which:

FIG. 1 is a perspective view of a double bank of filing cabinets and two cabinet drawer retrieval saddles for delivery of a drawer to a consultation location above the cabinets; and FIG. 2 is a perspective view of a double bank of filing cabinets and two cabinet drawer retrieval saddles for delivery of a drawer to a consultation location below the cabinets.

Referring to the drawing, reference numerals 28 and 29 show two facing banks of drawers and between them is saddle 30. Saddle 30 is constructed in the same manner as the saddle shown in my said patent and is operated in the same manner described in said patent to extract any one of the drawers from either bank 28 or 29 and to deliver it to consultation station 31 or to the retrieval saddle 32. In turn, saddle 32 is also constructed in the same manner as the saddle described in said patent, and travels up and down frame 33 to deliver a drawer placed on saddle 32 by saddle 30 to a consultation location 34 above (FIG. 1) or below (FIG. 2) the banks of filing cabinets 28 and 29. Saddle 32 moves up and down frame 33 via a suitable drive means (not shown). The various paths of travel of the saddles 30 and 32 are indicated by the dashed lines in FIGS. 1 and 2. Saddles 30 and 32 are likewise operable to return the extracted drawers to their original locations, as in said patent.

In particular, saddle 30 is constructed as described in said patent and has an extracting hook unit (not shown) adapted to hook onto any of said drawers to extract same from its bank 28 or 29 or to deposit same in the consultation location 31 or back in its bank, first drive means (not shown) in the form of a drive chain, belt, band means or the like drivingly connected to said hook unit, second drive means (not shown) in the form of a drive chain, belt, band means or the like, a prime mover (not shown) adapted to drive the first and second drive means in the same direction, electrically operated clutch means (not shown) connecting the first drive means and the prime mover, said clutch means being operable to disconnect the prime mover from the first drive means so that the second drive means can be driven while the first drive means is stopped, electrically operable displacement means (not shown) for displacing the hook unit downwards, enabling a drawer driven by the second drive means to pass over said hook unit, and electrical detection and control means (not shown) for rendering the saddle operative in a sequence to extract a drawer from either filing bank 28 or 29 by engaging the drawer with the hook unit, extracting the drawer by movement of the hook unit through the first drive means, disengaging the hook unit from the drawer by downwardly displacing the hook unit when the drawer is partially removed from the bank, terminating the drive to the first drive means by disengaging the clutch means, and completing the extraction of the drawer onto the saddle 30 by displacing it with the second drive means until it is fully supported on the saddle 30, at which point the drive to the second drive means is stopped, said saddle 30 being capable of returning the drawer to its bank 28 or 29 or into the consultation location 34 essentially by a reverse of the aforesaid sequence of operations.

Frame 33 and saddle 32 are arranged within the cabinet and replace partially or completely two vertical sets of drawers. Saddle 30 can then move alongside saddle 32 by means of the same control means used to position saddle 30 adjacent a desired drawer. The transfer of a drawer from saddle 30 to saddle 32 takes place by operating only the bands 10 (described in said patent) with the hook unit being lowered during said transfer. When saddle 32 has received the drawer, it moves vertically in order to reach consultation location 34 arranged on upper level B (FIG. 1) or lower level C (FIG. 2). Saddle 32 delivers the drawer to the right or the left on the consultation location 34 on level B or C.

The reverse sequence operations will be performed to place the drawer back in to its location in the cabinet from consultation locations 31 or 34, as shown by the dashed arrows.

If the consultation location 31 in the cabinet is unnecessary, it can be eliminated and the consultation will then take place only on consultation location 34.

For very large cabinets, it is possible to provide two or more additional retrieval saddles 32 and associated frames 33, which can both deliver the drawers to the upper or lower location, or one can deliver the drawers to the upper location and the other to the lower location.

Operation of the saddle 32 for delivery of a drawer to consultation location 34, or retrieval of a drawer therefrom, is by the same means and in the same manner as the saddle in said patent delivers a drawer to or retrieves a drawer from the consultation location. The transfer of a drawer back and forth between saddles 30 and 32 is also by the same means and in the same manner as the saddle in said patent delivers a drawer to the cabinet, namely by lowering the hook unit and using the belt means.

The embodiment of the invention which has been described above has been given as an example and is not intended to limit the general scope of the invention as defined by the appended claims. In particular, it is intended that changes and improvements according to requirements involving the replacement of certain parts with the equivalent parts be within the scope of the claims.

What is claimed is:

1. An automatic filing cabinet retrieval apparatus for delivery of drawers to a consultation station, comprising:
   (a) two spaced, facing banks of filing cabinets having a plurality of filing cabinet drawers;
   (b) a vertically extending support frame;
   (c) b a first automatic retrieval saddle means mounted on said support frame for reciprocal vertical movement to and from a consultation station at a different vertical level than said banks;
   (d) a second automatic retrieval saddle means between said banks for extracting a drawer from either bank and delivering said drawer to said second saddle means and for returning an extracted drawer to its bank;
   (e) said first and second saddle means being operable to transfer an extracted drawer between them; and
   (f) said first saddle means being operable to deliver a drawer to said consultation location and to return a said drawer from said consultation location to said second saddle.

2. Apparatus according to claim 1, wherein said consultation location is above said banks.

3. Apparatus according to claim 1, wherein said consultation location is below said banks.

4. Apparatus according to claim 1, wherein there are a plurality of said consultation locations, at least one consultation location being above said banks and at least one consultation location being below said banks.

5. Apparatus according to claim 1, wherein there is provided a plurality of said first saddle means and associated frames.

6. Apparatus according to claim 1, wherein there is a second consultation location on the same level as said banks, and said second saddle means is operable to deliver a drawer to and to return a drawer from said second consultation location.

* * * * *